C. B. WITHINGTON.
GRAIN-BINDER.

No. 189,165. Patented April 3, 1877.

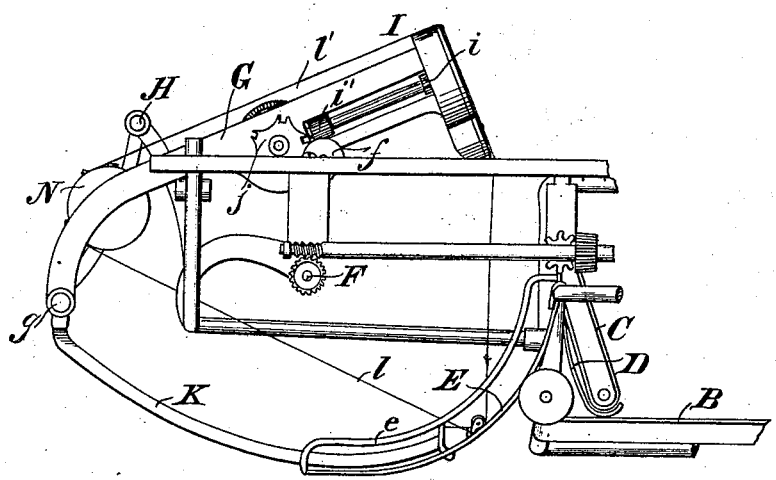

UNITED STATES PATENT OFFICE.

CHARLES B. WITHINGTON, OF JANESVILLE, WISCONSIN, ASSIGNOR TO
C. H. AND L. J. McCORMICK, OF CHICAGO, ILLINOIS.

IMPROVEMENT IN GRAIN-BINDERS.

Specification forming part of Letters Patent No. 189,165, dated April 3, 1877; application filed November 10, 1875.

*To all whom it may concern:*

Be it known that I, CHARLES B. WITHINGTON, of Janesville, Rock county, Wisconsin, have invented certain new and useful Improvements in Grain-Binding Mechanism, of which the following is a specification:

The nature, object, and subject-matter of my invention are hereinafter specifically designated.

Figure 1:
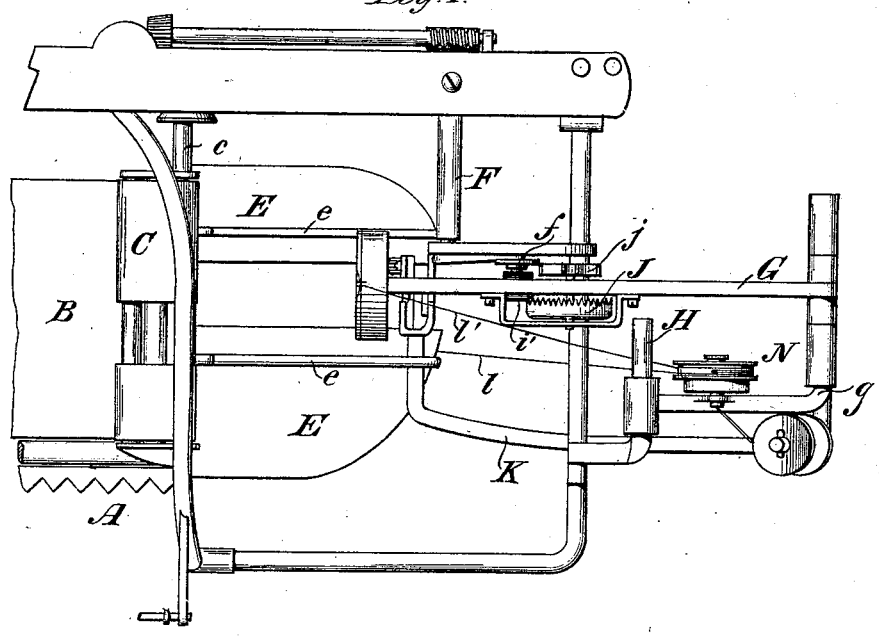
Figure 2:
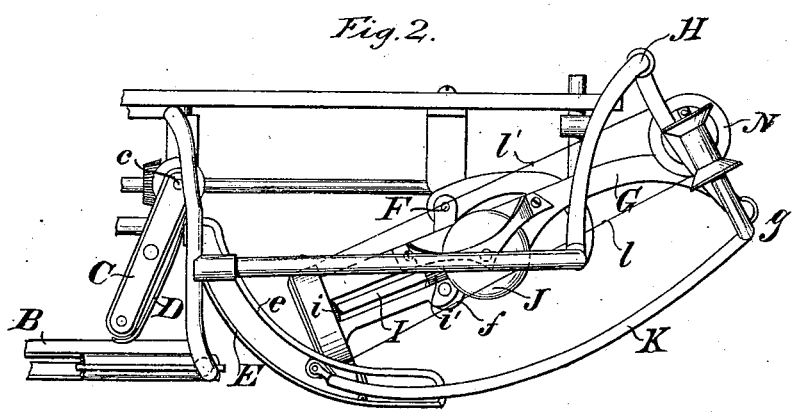

In the accompanying drawings, Figure 1 represents a plan or top view of so much of a harvester to which my improved apparatus is applied as is necessary to illustrate the subject-matter herein claimed. Fig. 2 is a front elevation, and Fig. 3 a rear elevation, thereof.

The grain severed by the cutting apparatus A falls upon an endless apron, B, which delivers the grain to an elevating-apron, C, free to swing around its driving-shaft $c$. The grain is carried up between this apron and an inclined grain-board, D, and delivered in a continuous stream into a receptacle, E, composed, in this instance, of a concave bottom, over which are arranged parallel ribs, guides, or rods $e$, upon which the grain rests.

A rotating crank-shaft, F, mounted upon the frame of the machine, vibrates and moves endwise a binding-arm, G, pivoted on a shaft, $g$, suspended by a guide-arm or sway-bar from an overhanging arm or bracket, H, of the frame. The binding-arm carries a binding-head containing a cutting and twisting mechanism, substantially like that shown in Letters Patent of the United States granted to me February 20, 1872. In this instance, however, the cutter-pinions are intermittently rotated by a driving-gear, $i$, mounted on a shaft, I, carrying at its rear end a spur-pinion, $i'$, gearing into a crown-wheel, J, driven from the crank-shaft F by means of a one-toothed wheel, $f$, mounted thereon, which acts at suitable intervals to effect the cutting and twisting of the wire at the proper time upon a sectional wheel, $j$, mounted on the same axis as the crown-wheel J.

A wire-carrying arm, K, pivoted on the swinging shaft $g$, extends over the platform, and is bent inwardly, so as to bring its end underneath the binding-head at Fig. 1, with the wire in proper position to be seized thereby. This wire-carrying arm works underneath the guard-rails or parallel rods $e$ of the receptacle, and its head moves in a slot cut in said receptacle.

The mechanism shown is adapted for the use of two wires.

In this instance both wires are represented as passing from the same reel; but separate reels might be used, if preferred. Both wires likewise pass through and around an intermediate take-up tension-drum, N, substantially such as shown and described in an application for Letters Patent filed by me March 5, 1874. Thence the wire $l$ passes directly to the roller on the lower end of the lower wire-carrying arm, and the upper one, $l'$, passes over the binding-head, and the two ends are joined together, as shown in Fig. 3, in which figure the wire-carrying arm and binding-head are represented as moving forward to encompass the grain flowing into the receptacle.

The binding-head descends into the incoming grain, separating it and carrying the wire around the bundle, and when the binding-head and wire-carrying arm come together, as in Fig. 2, both wires are brought within the slit of the twister-head. One of the wires, in fact, is brought within the grasp of the twister-pinions, and these pinions being disengaged at this moment, the strain of the wire is sufficient to cause them to make a half-turn, so as to bring one wire to the back of the binding-head, when the other enters the slit in the binding-head in front, at the moment of the junction of the binding-head and wire-carrying arm. At this moment the one-toothed gear $f$ on the crank-shaft acts on the sector-gear $j$, thus rotating the twister-pinions, and forms the twist in the wire. As soon as this is done one of the cutter-pinions is stopped by coming in contact with a suitable detent, while the other continues to revolve, thus severing the wire, substantially as shown in my patent of February 20, 1872.

In this instance I have shown the binding-head as mounted on the upper vibrating arm; but it is obvious that its location may be reversed, so that the wire-carrying arm would be above and the binding-head below.

I have also substituted, with good effect, a stationary rack, conforming to the curve of the receptacle, for the gearing shown, to actuate the cutter-pinion, in which case the teeth which drove the cutter-pinions projected through the binding-head, so as to engage with the rack as the bundle was being bound.

It will be observed that the binding-head has a peculiar compound vibrating motion in a vertical path, its rear end being connected with the shaft, swinging around its point of suspension on the frame, while the middle of the arm describes a circle coincident with the axis of the crank-shaft.

I am thus enabled to obtain the desired range of movement of the binding mechanism without the use of fixed guides or ways.

I claim as of my own invention—

1. The combination, substantially as hereinbefore set forth, of a binder-arm and a wire-carrying arm mounted on a common swinging support, and a crank-shaft for actuating them.

2. The combination, substantially as hereinbefore set forth, of a grain-receptacle, a wire-carrying arm, and a binding-head, both of the latter vibrating in a vertical plane, for the purpose set forth.

In testimony whereof I have hereunto subscribed my name.

CHAS. B. WITHINGTON.

Witnesses:
WM. J. PEYTON,
E. C. DAVIDSON.